United States Patent [19]

Kishi et al.

[11] 4,073,782
[45] Feb. 14, 1978

[54] WRAPPING FILM

[75] Inventors: Hidehiro Kishi; Hiroshi Harakawa, both of Ichihara; Kazuo Ogawa, Chiba; Seiko Tsutsui, Ichihara, all of Japan

[73] Assignee: UBE Industries, Ltd., Ube, Japan

[21] Appl. No.: 652,765

[22] Filed: Jan. 27, 1976

[30] Foreign Application Priority Data

Jan. 31, 1975 Japan ................................ 50-12348

[51] Int. Cl.$^2$ ............................................. C08L 91/00
[52] U.S. Cl. ............................ 260/23 H; 260/23 AR; 260/28.5 AV; 260/28.5 A; 428/220
[58] Field of Search ..................................... 260/23, 27

[56] References Cited

U.S. PATENT DOCUMENTS

| 3,386,936 | 6/1968 | Gordy | 260/27 R |
|---|---|---|---|
| 3,479,308 | 11/1969 | Gattenby | 260/23 |

Primary Examiner—Melvyn I. Marquis
Assistant Examiner—W. Parker
Attorney, Agent, or Firm—Miller & Prestia

[57] ABSTRACT

A wrapping film having a high wrapping workability and an excellent anti-hazing property comprises a composition comprising 100 parts by weight of polyethylene, a copolymer of 25% by weight or less of vinyl acetate with 75% by weight or more of ethylene or a mixture of two or more of the above-mentioned polymeric substances, 0.5 to 6 parts by weight of sorbitan monooleate and 0.5 to 6 parts by weight of a liquid paraffin having a dynamic viscosity of 30 to 80 centistokes at a temperature of 38° C.

8 Claims, No Drawings

WRAPPING FILM

The present invention relates to a wrapping film. More particularly, the present invention relates to a wrapping film made of an ethylene polymer or copolymer. The term "wrapping film" used herein refers to a plastic film for home use or wrap or cover various foods and articles and for industrially wrapping, especially, stretch-wrapping, various commercial foods and articles.

Conventional wrapping films are made of a soft vinyl chloride polymer or soft vinyl chloride-vinylidene chloride copolymer. However, they have the following disadvantages.

(1) Since the wrapping films contain a large amount of plasticizer which has a tendency to separate from the polymer or copolymer and migrate onto the film surface, the wrapped food or article is sometimes contaminated by said plasticizer, especially when the wrapped food is fatty or oily.

(2) When the wrapping films are discarded and burnt, the smoke includes toxic gases such as chlorine.

(3) Since the wrapping films have a relatively high brittle temperature (glass transition point), it is difficult to utilize them to wrap refrigerated foods.

(4) When the wrapping films are heat welded or heat cut, chlorine gas is generated, which tends to corrode the packaging machine and polute the operational environment.

(5) Since the wrapping films have a low gas permeability, it is difficult to keep the wrapped perishable food fresh.

The object of the present invention is to provide a wrapping film which does not contaminate the wrapped food or article, does not generate toxic and corrosive gas such as chlorine when burnt, and has a relatively low brittle temperature and a high gas permeability.

The inventors have perceived that polyethylene and ethylene-vinyl acetate copolymers are usable as a new wrapping material which do not have the above-mentioned disadvantages and have studied how to utilize them. As a result of that study, the inventors have discovered that wrapping film made of a composition comprising a polyethylene or ethylene-vinyl acetate copolymer, sorbitan monooleate and a liquid paraffin, has a high workability for wrapping due to its excellent anti-hazing effect, its moderate stickiness, and the fact that it has no odor, and, therefore, is well-suited to be used as wrapping film. The present invention has been attained on the basis of this discovery.

The wrapping film of the present invention comprises a composition comprising 100 parts by weight of a film-forming polymeric material selected from the group consisting of polyethylene, copolymers of 25% by weight or less of vinyl acetate with 75% by weight or more of ethylene, and mixtures of two or more of the above-mentioned polymeric substances, 0.5 to 6 parts by weight of sorbitan monooleate and 0.5 to 6 parts by weight of a liquid paraffin having a dynamic viscosity of 30 to 80 centi-stokes determined at a temperature of 38° C.

The composition usable for the present invention preferably has a melt index lower than 20. The composition having a melt index of 20 or higher sometimes has a poor film-forming property or results in the formation of numerous pin holes in the film.

The polyethylene usable for the present invention may be a low density polyethylene produced by a polymerization method under a high pressure, a high density polyethylene produced by a polymerization method under a low or middle pressure, or a mixture of two or more of the above-mentioned types of polyethylenes, and preferably has a melt index falling in a range from 1 to 15. If the polyethylene has a melt index which falls outside the above-mentioned range, the film-forming property of the composition may be poor.

The copolymer usable for the present invention consists of 25% by weight or less of vinyl acetate, with the balance being ethylene. Other ethylene copolymers containing more than 25% by weight of vinyl acetate is not desirable, because they have a poor film-forming property. The copolymer for the present invention preferably has a melt-index of 1 to 8. A melt index outside this range may cause a poor film-forming property of the composition.

Generally, the wrapping film of the present invention obtained by using polyethylene or an ethylene copolymer containing less than 15% by weight of vinyl acetate are useful in the home to wrap or cover household foods. In addition, the ethylene copolymer containing 15 to 25% by weight of vinyl acetate is industrially useful, especially for stretch-wrapping various food and articles.

In the wrapping film of the present invention, sorbitan monooleate is utilized as an anti-hazing agent. If other compounds, for example, sorbitan trioleate, sorbitan monopalmitate, sorbitan stearate and sorbitan laurate, are used as the anti-hazing agent, the resultant film has an undesirable odor, a low transparency and low compatibility with the polymeric material. Accordingly, said other compounds are not suitable as the anti-hazing agent for wrapping film.

The sorbitan monooleate is mixed in an amount of 0.5 to 6% based on the weight of the polymeric material, thereinto. When the polyethylene is employed as the polymeric material, it is preferable that the sorbitan monooleate is used in an amount of 0.5 to 2.0% based on the weight of the polyethylene. Otherwise, when the polymeric material consists of ethylene copolymer, it is preferable that the copolymer is mixed with 1.0 to 6.0% of the sorbitan monooleate, based on the weight of the copolymer.

If the sorbitan monooleate is used in an amount which is less than 0.5% based on the weight of the polymeric material, the resultant film has a poor anti-hazing property. If the sorbitan monooleate is employed in an amount larger than 6% based on the weight of the polymeric material, the resultant film is excessively sticky even if liquid paraffin is contained therein. Such excessively high stickiness results on the following disadvantages. When the film is used to hand-wrap something, its workability is very poor because pieces of the film undesirably adhere to each other. When the film is used for automatically wrapping something, its workability is very poor and the resultant package has a bad appearance, because the film sometimes undesirably winds onto the conveyor rollers due to its high stickiness. Further, the undesirable necking phenomenone often occurs when the film comes into contact with trays which receive the articles or food to be wrapped, due to the high adhesiveness of the film to the tray.

In the wrapping film of the present invention, a liquid paraffin having a dynamic viscosity of 30 to 80 centi-stokes determined at a temperature of 38° C is mixed with the polymeric material and the sorbitan monooleate.

The amount of the liquid paraffin to be mixed falls in a range from 0.5 to 6% based on the weight of the polymeric material. When the content of the liquid paraffin is less than 0.5%, the resultant film has an excessively high stickiness. However, when the content of the liquid paraffin is larger than 6%, the adhesiveness of the resultant film is so low that the film can not be utilized for wrapping.

If a liquid paraffin having a dynamic viscosity smaller than 30 centi-stokes at 38° C is used, the resultant film has a very low stickiness, and a liquid paraffin having a dynamic viscosity larger than 80 centi-stokes at 38° C results in film having an undesirably high stickiness.

In the wrapping film of the present invention, it is preferable that the ratio by weight of the sorbitan monooleate to the liquid paraffin falls in a range from 1:3 to 3:1, and more preferably is 1:1.

The wrapping film having an excellent anti-hazing property and a proper stickiness necessary for smoothly carrying out the wrapping operation can be obtained by adding both the sorbitan monooleate and the liquid paraffin to the polymeric material in accordance with the present invention. That is, a film consisting of the polymeric material and the sorbitan monooleate only has a high anti-hazing property, but is excessively sticky and, therefore, can not be utilized as wrapping film. A film consisting of the polymeric material and the liquid paraffin only has a very poor anti-hazing property and, therefore, is not suitable either.

There is no limitation with regard to the mixing method for the sorbitan monooleate and the liquid paraffin with the polymeric material. They can be uniformly mixed by any of the conventional mixing apparatuses, for example, kneader, extruder, etc.

The wrapping film of the present invention can be made from the composition comprising the polymeric material, sorbitan monooleate and liquid paraffin at a temperature of 150° to 230° C by a conventional film-forming method, for example, T-die method, inflation method and calender roller method, and preferably has a thickness of 10 to 30 $\mu$.

The wrapping film of the present invention can be employed for hand wrapping various foods and articles and for stretch wrapping them by an automatic wrapping machine.

The following examples will serve to more fully illustrate the practice of the present invention. However, it will be understood that these are only examples and in no way limit the scope of the present invention.

In the examples, tensile strength and percentage elongation at break of the film were measured in accordance with Method A of ASTM D-882, and the modules of elasticity of the film was determined in accordance with the method of ASTM D-638.

The anti-hazing property of the film was determined using a method whereby one-liter beaker containing therein 800 ml of water having a temperature of 20° C, was sealed with a film to be tested, and the beaker thus sealed with the film was kept in a refrigerator at a temperature of $-10°$ C for 30 minutes. Thereafter, said beaker was taken from the refrigerator and the hazing phenomena on the underside of the film was observed.

Elastic recovery percentage of the film was determined by the following method. A film to be tested was subjected to preparation of dumb-bell-shaped specimens (Type I) in accordance with ASTM D-638. In accordance with Method A of ASTM D-882, the ends of the specimen were held by the grips of a constant-rate-of-cross-head-movement type testing machine, the grips were separated at a constant separating rate of 50 cm/min. so as to stretch the specimen to a predetermined percentage of elongation, and, thereafter, the grips were returned at a returning rate of 50 cm/min. so as to allow the stretched specimen to elastically shrink, and the elastic recovery percentage of the specimen was then measured.

EXAMPLE 1 AND COMPARISON EXAMPLE 1

A composition was prepared by mixing 100 parts by weight of polyethylene having a melt index of 5.0 with 1 part by weight of sorbitan monooleate and 1 part by weight of liquid paraffin having a dynamic viscosity of 43 centi-stokes measured at 38° C. The composition was subjected to a T-die film-forming process at a die temperature of 200° C to produce a wrapping film having a thickness of 18 $\mu$.

In Comparison Example 1, the same procedures as mentioned above were repeated, except that no liquid paraffin was used, to produce a comparative film.

The resultant film of the present example had an excellent anti-hazing property and a desirable stickiness, whereas the comparative film was excessively sticky. The resultant film of the present example had a superior workability for wrapping various articles and was able to closely adhere to the surfaces of the articles.

EXAMPLES 2 THROUGH 4 AND COMPARISON EXAMPLES 2 THROUGH 4

In each of the Examples 2 through 4, a composition was prepared by mixing 100 parts by weight of a copolymer consisting of 20% by weight of vinyl acetate and the balance of ethylene and having a melt index of 2.5 with sorbitan monooleate and liquid paraffin having a dynamic viscosity of 43 centi-stokes at a temperature of 38° C each in the amounts indicated in Table 1. The composition was subjected to a T-die film-forming process at a die temperature of 180° C, to produce a film 18 $\mu$ thick. The resultant films of Examples 2 through 4 had the properties indicated in Table 1.

The resultant films of Examples 2 through 4 were subjected to an automatic stretch-packing process for various articles. All of the films were able to automatically stretch-pack the articles without difficulty.

In Comparison Example 2, the same procedure as in Example 2 were repeated, except that neither the sorbitan monooleate nor the liquid paraffin were used. The resultant comparative film had the properties indicated in Table 1. Particularly, the comparative film had a poor anti-hazing property and a poor stickiness.

In comparison Example 3, the same procedures as in Example 3 were carried out, except that liquid paraffin was not used. The resultant comparative film had the properties indicated in Table 1, particularly an excessive quality of adhesiveness. The comparative film was subjected to an automatic stretch-packing process for various articles. However, tight packaging of the articles could not be obtained, because when a portion of the film came into contact with an end of a tray receiving the articles, that portion of the film produced an undesirable necking phenomena, and some portions of the film which were mutually superimposed became separated from each other after the packing process was completed.

In Comparison Example 4, the same operations as in Example 3 were effected, except that sorbitan monooleate was not used. The resultant comparative film had the properties show in Table 1, especially, a poor anti-hazing property.

mer consisting of 15% by weight of vinyl acetate, the balance being ethylene and having a melt index of 2.0, was used.

The resultant film had a good anti-hazing property and a high workability for packing various articles, and Table 1

| Item | Example No. 2 | Example No. 3 | Example No. 4 | Comparison Example No. 2 | Comparison Example No. 3 | Comparison Example No. 4 |
|---|---|---|---|---|---|---|
| Sorbitan monooleate (part by weight) | 2.0 | 3.0 | 5.0 | 0 | 3.0 | 0 |
| Liquid paraffin (part by weight) | 2.0 | 3.0 | 5.0 | 0 | 0 | 3.0 |
| Tensile strength at break (kg/cm$^2$) | 203 | 198 | 193 | 210 | 191 | 174 |
| Percentage of elongation at break (%) | 380 | 385 | 370 | 410 | 404 | 392 |
| Elastic recovery (%) 75% | 76.5 | 75.0 | 74.5 | 91.0 | 86.5 | 85.2 |
| 100% | 74.2 | 73.0 | 73.0 | 83.0 | 80.5 | 87.6 |
| 125% | 68.8 | 69.0 | 68.8 | 72.2 | 71.0 | 70.5 |
| Modulus of elasticity (kg/cm$^2$) | 289 | 271 | 265 | 438 | 361 | 285 |
| Anti-hazing property | good | good | good | poor | good | poor |

EXAMPLES 5 THROUGH 7

In each of the Examples 5 through 7, operations identical to those in Example 2 were carried out to produce a film having a thickness of 18 μ, except that the sorbitan monooleate and the liquid paraffin were used in the amounts indicated in Table 2, wherein the properties of the resultant films are also indicated.

The films were subjected to an automatic stretch packing process. The packing operations were smoothly effected without the necking phenomena occurring on the film. Also, after the completion of the packing operations by which some portions of the film were mutually superimposed, it was observed that said mutually superimposed portions of the film could be maintained without peeling.

Table 2

| Item | Example No. 5 | Example No. 6 | Example No. 7 |
|---|---|---|---|
| Sorbitan monooleate (part by weight) | 1.5 | 2.0 | 2.5 |
| Liquid paraffin (part by weight) | 2.5 | 3.0 | 2.5 |
| Tensile strength at break (kg/cm$^2$) | 209 | 194 | 201 |
| Percentage of elongation at break (%) | 385 | 390 | 391 |
| Elastic recovery (%) 75% | 77.4 | 75.6 | 76.1 |
| 100% | 73.6 | 72.6 | 74.4 |
| 125% | 68.0 | 67.0 | 69.4 |
| Modulus of elasticity (kg/cm$^2$) | 285 | 270 | 283 |
| Anti-hazing property | good | good | good |

EXAMPLE 8

A composition was prepared by mixing 100 parts by weight of a copolymer consisting of 10% by weight of vinyl acetate and the balance of ethylene and having a melt index of 4.0 with 1.0 part by weight of sorbitan monooleate and 1 part by weight of liquid paraffin. The composition was subjected to the same film-forming process as in Example 2 to produce a film having a thickness of 15 μ.

The resultant film had a good anti-hazing property and a high workability for wrapping various articles, and could maintain a tight contact with the articles.

EXAMPLE 9

A film having a thickness of 15 μ was prepared by the same operations as in Example 8, except that a copolymer consisting of 15% by weight of vinyl acetate, the balance being ethylene and having a melt index of 2.0, was used.

The resultant film had a good anti-hazing property and a high workability for packing various articles, and could maintain a close contact with the articles.

COMPARISON EXAMPLES 5 THROUGH 10

In each of the Comparison Examples 5 through 10, the same operations as in Example 9 were repeated using the compounds indicated in Table 3 instead of the sorbitan monooleate, to produce a film having a thickness of 15 μ. The anti-hazing property of the resultant comparative films are indicated in Table 3.

Table 3

| Comparison Example No. | Compound | Anti-hazing property |
|---|---|---|
| 5 | sorbitan triooleate | poor |
| 6 | Sorbitan monopalmitate | poor |
| 7 | Sorbitan monostearate | poor |
| 8 | Sorbitan tristearate | poor |
| 9 | Glicerin ester of fatty acid (*) | poor |
| 10 | Sorbitan monolaurate | poor |

Note: Trademark: Atmos 150 made by Kao-Atlas Co.

As can be seen from Table 3, the resultant comparative films had such a poor anti-hazing property that none of them could be utilized as wrapping film.

Additionally, the sorbitan monolaurate uaed in Comparison Example 10, was liquid and had a poor compatibility with the ethylene-vinyl acetate copolymer. Accordingly, in Comparison Example 10, it was very difficult to produce a good film.

COMPARISON EXAMPLES 11 THROUGH 13

In each of the Comparison Examples 11 through 13, the same procedures as in Example 3 were carried out to produce a comparative film 18 μ thick, except that the compound indicated in Table 4 was employed in place of the liquid paraffin.

Table 4

| Comparison Example No. | Compound | Anti-hazing property |
|---|---|---|
| 11 | Butyl stearate | poor |
| 12 | Glycerin | good |
| 13 | Triethylene glycol | poor |

All of the resultant comparative films were excessively sticky. When the films were subjected to an automatic packing machine to stretch-pack various articles, the necking phenomena occurred on portions of the film which were in contact with an end portion of a tray. Accordingly, nicely packaged articles could not be obtained using said comparative films.

COMPARISON EXAMPLE 14

A comparative composition was prepared by mixing 100 parts by weight of a copolymer of 15% by weight of vinyl acetate and the balance of ethylene having a melt index of 2.0 with 3 parts by weight of sorbitan monooleate and 3 parts of a liquid paraffin having a dynamic viscosity of 21 centi-stokes at a temperature of 38° C. The comparative composition was subjected to a T-die film-forming process at a die temperature of 200° C to produce a film 18 μ thick. The liquid paraffin used above had poor heat-resistance and thermally decomposed at the film-forming temperature. Therefore, during the film-forming operation, a large amount of decomposition products were generated from the die such as smoke. The decomposition products were cooled and deposited on a cooling roller and the resultant film was brought into contact therewith. Accordingly, the resultant film was flawed and stained by the decomposition product. Said film was useless as a commercial wrapping material. Also, the film had a very poor adhesiveness and, therefore, could not maintain a tight contact with the wrapped article.

COMPARISON EXAMPLE 15

The same procedures as in Comparison Example 14 were repeated to produce a film 18 μ thick, except that a liquid paraffin having a dynamic viscosity of 95 centi-stokes at a temperature of 38° C was employed. The resultant film was excessively sticky and had a poor workability for packing.

COMPARISON EXAMPLE 16

A comparative composition was prepared by mixing 100 parts by weight of a copolymer consisting of 20% by weight of vinyl acetate and the balance of ethylene and having a melt index of 2.5 with 2.0 parts by weight of sorbitan monooleate and 7.0 parts by weight of liquid paraffin having a dynamic viscosity of 43 centi-stokes at a temperature of 38° C. The comparative composition was converted into a film 18 μ thick by a T-die film-forming process at a die temperature of 180° C. Since the comparative composition had a melt index of 20, the resultant film had numerous pin-holes even if the film was produced by either the T-die process or the inflation process. Such film could not be used as wrapping material.

COMPARISON EXAMPLE 17

A comparative film 18 μ thick was prepared by the same procedures as in Example 2, except that the sorbitan monooleate was used in an amount of 7.0 parts by weight.

The resultant film was excessively sticky. When the film was subjected to an automatic packing process to stretch pack various articles, the undesirable necking phenomenone occurred at the portions of the film which were in contact with an end portion of a tray. Accordingly, a nicely packaged article could not be obtained.

What we claim is:

1. A wrapping film comprising a composition which comprises (I) 100 parts by weight of a film forming polymeric material selected from the group consisting of (A) polyethylene, (B) copolymers of 25% by weight or less of vinyl acetate and 75% by weight or more of ethylene, and (C) mixtures of (A) and (B), (II) 0.5 to 6 parts by weight of sorbitan monoleate and (III) 0.5 to 6 parts by weight of a liquid paraffin having a dynamic viscosity of 30 to 80 centi-stokes determined at a temperature of 38° C.

2. A wrapping film as claimed in claim 1, wherein said polymeric material consists of polyethylene having a melt index of 1 to 15.

3. A wrapping film as claimed in claim 1, wherein said polymeric material consists a vinyl acetate-ethylene copolymer having a melt index of 1 to 8.

4. A wrapping film as claimed in claim 1, wherein said polymeric material consists of polyethylene and said sorbitan monooleate is in an amount of 0.5 to 2.0% based on the weight of said polyethylene.

5. A wrapping film as claimed in claim 1, wherein said polymeric material consists of a vinyl acetate-ethylene copolymer and said sorbitan monooleate is in an amount of 1.0 to 6.0% based on the weight of said copolymer.

6. A wrapping film as claimed in claim 1, wherein a ratio by weight of said sorbitan monooleate to said liquid paraffin is in a range from 1:3 to 3:1.

7. A wrapping film as claimed in claim 6, wherein said ratio by weight of said sorbitan monooleate to said liquid paraffin is 1:1.

8. A wrapping film as claimed in claim 1, wherein said film has a thickness of 10 to 30 μ.

* * * * *